(12) United States Patent
Kim et al.

(10) Patent No.: US 9,554,013 B2
(45) Date of Patent: Jan. 24, 2017

(54) ARITHMETIC MEMORIES, IMAGE SENSORS INCLUDING THE SAME, AND METHODS OF OPERATING THE ARITHMETIC MEMORIES

(71) Applicants: Samsung Electronics Co., Ltd., Suwon-si (KR); IUCF-HYU (Industry-University Cooperation Foundation Hanyang University), Seoul (KR)

(72) Inventors: Yun-Jung Kim, Yongin-si (KR); Jong-Boo Kim, Seoul (KR); Oh-Kyong Kwon, Seoul (KR)

(73) Assignees: Samsung Electronics Co., Ltd. (KR); IUCF-HYU (Industry-University Cooperation Foundation Hanyang University (KR)

( * ) Notice: Subject to any disclaimer, the term of this patent is extended or adjusted under 35 U.S.C. 154(b) by 5 days.

(21) Appl. No.: 14/640,273

(22) Filed: Mar. 6, 2015

(65) Prior Publication Data
US 2015/0304519 A1  Oct. 22, 2015

(30) Foreign Application Priority Data
Apr. 21, 2014  (KR) .................. 10-2014-0047462

(51) Int. Cl.
*H04N 1/21* (2006.01)
*H04N 5/378* (2011.01)
*H04N 5/357* (2011.01)
(52) U.S. Cl.
CPC .......... *H04N 1/2129* (2013.01); *H04N 5/3575* (2013.01); *H04N 5/378* (2013.01)

(58) Field of Classification Search
CPC ....... H04N 5/3575; H04N 5/378; H04N 5/374
See application file for complete search history.

(56) References Cited

U.S. PATENT DOCUMENTS

| 7,088,278 B2 | 8/2006 | Kurose et al. |
| 7,088,279 B2 | 8/2006 | Muramatsu et al. |

(Continued)

FOREIGN PATENT DOCUMENTS

KR  101111638  1/2012

OTHER PUBLICATIONS

Very large scale Integration, http://www.vlsiencyclopedia.com/2012/04/draw-xor-gate-using-2 1-multiplexer.html Apr. 2012.*

*Primary Examiner* — James Hannett
(74) *Attorney, Agent, or Firm* — Myers Bigel, P.A.

(57) ABSTRACT

Arithmetic memories, image sensors including the arithmetic memories and methods of operating the arithmetic memories are provided. The arithmetic memories may include an input block to which a digital pixel reset signal and a digital pixel image signal are input and a plurality of unit cells configured to generate a digital difference signal. The input block may include first and second multiplexers to which the digital pixel reset signal and the digital pixel image signal are input and an inverter connected to the first multiplexer. The plurality of unit cells may include a first unit cell connected to the input block and a second unit cell through an N-th unit cell successively connected to the first unit cell. N may be two or greater. The first unit cell may include third and fourth multiplexers, a first flip/flop, and a first AND gate.

13 Claims, 19 Drawing Sheets

(56) References Cited

U.S. PATENT DOCUMENTS

| | | |
|---|---|---|
| 7,508,427 B2 | 3/2009 | Choi |
| 7,876,371 B2 | 1/2011 | Otaka |
| 7,995,123 B2 | 8/2011 | Lee et al. |
| 8,059,173 B2 | 11/2011 | Walschap et al. |
| 8,169,517 B2 | 5/2012 | Poonnen et al. |
| 8,248,284 B2 | 8/2012 | Jung et al. |
| 8,462,246 B2 | 6/2013 | Lee et al. |
| 2005/0237406 A1 | 10/2005 | Kim et al. |
| 2009/0091648 A1 | 4/2009 | Lin et al. |
| 2009/0244334 A1* | 10/2009 | Otaka .................. H04N 5/3575 348/294 |

* cited by examiner

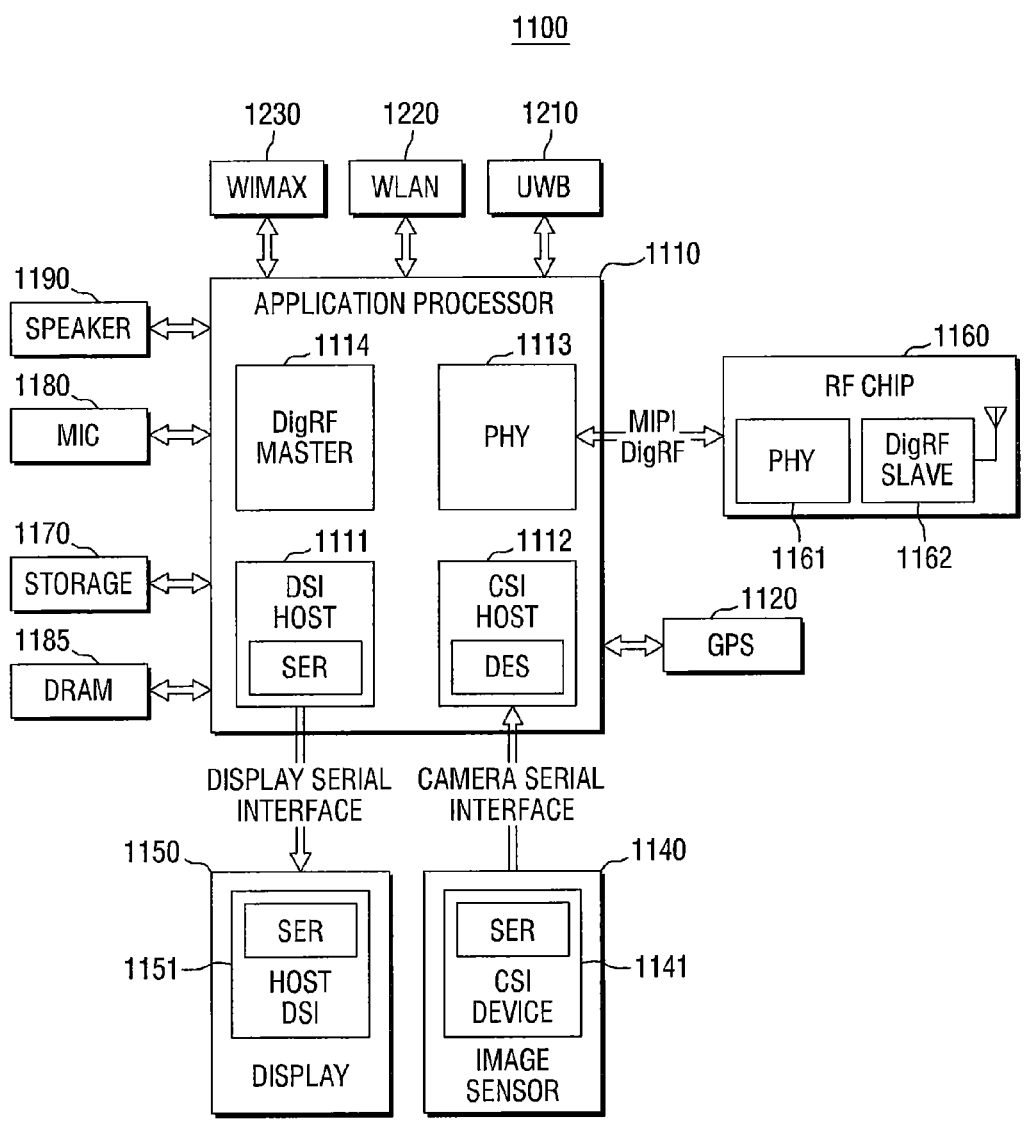

ARITHMETIC MEMORIES, IMAGE SENSORS INCLUDING THE SAME, AND METHODS OF OPERATING THE ARITHMETIC MEMORIES

CROSS-REFERENCE TO RELATED APPLICATION

This U.S. non-provisional application claims priority under 35 U.S.C. §119 to Korean Patent Application No. 10-2014-0047462, filed on Apr. 21, 2014 in the Korean Intellectual Property Office, the disclosure of which is incorporated herein by reference in its entirety.

BACKGROUND

The present disclosure generally relates to the field of electronics and, more particularly, to arithmetic memories.

An image sensor is a device that converts an optical image into an electrical signal. With recent advancements in computer and communication industries, the demand for image sensors with enhanced performance is increasing in various fields such as digital cameras, camcorders, personal communication systems, game devices, security cameras, microcameras for medical use, and robots

SUMMARY

Arithmetic memories according to some embodiments of the present inventive concept may have circuit structure that may be simplified to reduce design area and power consumption.

Some embodiments of the present inventive concept may provide an image sensor whose circuit structure may be simplified to reduce design area and power consumption.

Some embodiments of the present inventive concept may also provide a method of operating an arithmetic memory whose circuit structure may be simplified to reduce design area and power consumption.

However, the present inventive concept is not restricted to the one set forth herein. The present inventive concept will become more apparent to one of ordinary skill in the art to which the present inventive concept belongs by referencing the detailed description of the present inventive concept given below.

According to some embodiments of the present inventive concept, an arithmetic memory module is provided and the arithmetic memory module may include an input block to which a digital pixel reset signal and a digital pixel image signal are input and a plurality of unit cells configured to generate a digital difference signal representing a difference between the digital pixel reset signal and the digital pixel image signal. The input block may include first and second multiplexers to which the digital pixel reset signal and the digital pixel image signal are input and an inverter that is connected to the first multiplexer. The plurality of unit cells may include a first unit cell that is connected to the input block and a second unit cell through an N-th unit cell that are successively connected to the first unit cell. N may be a natural number that may be two or greater. The first unit cell may include third and fourth multiplexers that are connected to the first multiplexer, a first flip/flop that is connected to the third multiplexer, and a first AND gate that is connected to the fourth multiplexer.

According to some embodiments of the present inventive concept, an arithmetic memory module is provided and the arithmetic memory module may include an input block to which a digital pixel reset signal and a digital pixel image signal are input and a plurality of unit cells configured to generate a digital difference signal representing a difference between the digital pixel reset signal and the digital pixel image signal. The input block may include a first multiplexer to which the digital pixel reset signal and the digital pixel image signal are input. The plurality of unit cells may include a first unit cell that is connected to the input block and a second unit cell through an N-th unit cell that are successively connected to the first unit cell. N may be a natural number that may be two or greater. The first unit cell may include second and third multiplexers which receive a feedback signal of the N-th unit cell and are connected to an inverter, a flip/flop that is connected to the second multiplexer, and an AND gate that is connected to the third multiplexer.

According to some embodiments of the present inventive concept, an image sensor is provided and the image sensor may include a pixel array including a plurality of pixels configured to provide a pixel reset signal and a pixel image signal and a digital correlated double sampling (CDS) module that is connected to the pixel array. The digital CDS module may include a successive approximation analog-to-digital conversion (SA ADC) module that is configured to convert the pixel reset signal and the pixel image signal in an analog form into a digital pixel reset signal and a digital pixel image signal and an arithmetic memory module that is configured to generate a digital difference signal representing a difference between the digital pixel reset signal and the digital pixel image signal. The arithmetic memory module may include an input block that receives the digital pixel reset signal and the digital pixel image signal, and the input block may include a first multiplexer and an inverter that is connected to the first multiplexer. The arithmetic memory module may also include a plurality of unit cells, and each of the plurality of unit cells may store a bit of the digital difference signal and may include a second multiplexer and an AND gate and a flip/flop that are connected to the second multiplexer.

BRIEF DESCRIPTION OF THE DRAWINGS

FIG. 12 is a block diagram of interfaces used in the computing system of FIG. 11.

DETAILED DESCRIPTION

Figure 1:
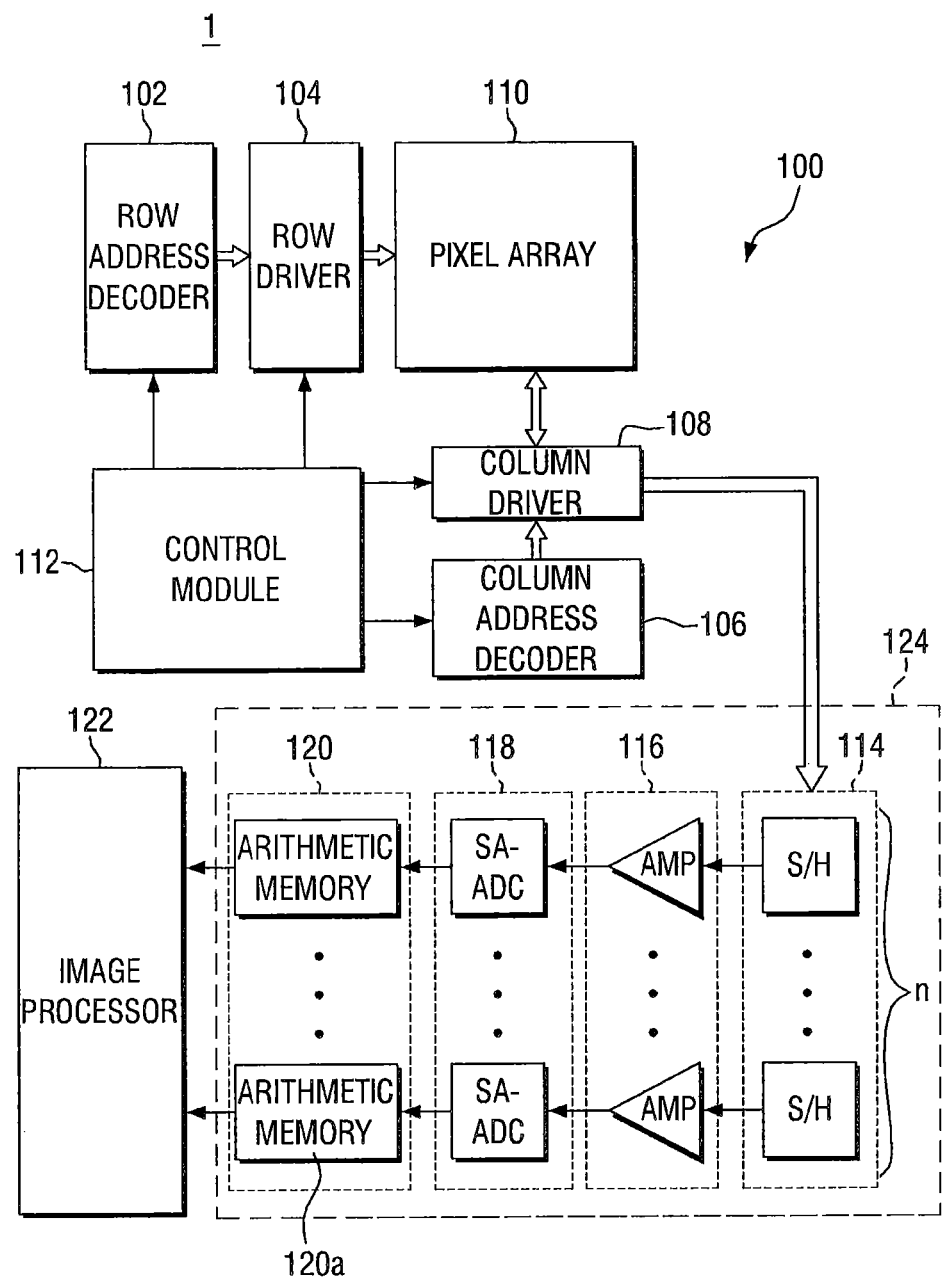
FIG. 1 is a block diagram of an image sensor according to some embodiments of the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

An image sensor according to some embodiments of the present inventive concept will now be described with reference to FIG. 1.

FIG. 1 is a block diagram of an image sensor according to some embodiments of the present inventive concept.

Referring to FIG. 1, an image sensor 1 may include a pixel array 110, a row driver 104, a column driver 108, a control module 112, a digital correlated double sampling (CDS) module 124, and an image processor 122.

The pixel array 110 may have pixels arranged in a predetermined number of rows and a predetermined number of columns.

Specifically, pixels located in a row of the pixel array 110 may be turned on simultaneously or concurrently by a row select line, and pixel signals of each column may be selectively provided to output lines by column select lines. Row select lines and column select lines may be provided for the entire pixel array 110.

The row driver 104 may selectively activate the row select lines in response to a row address decoder 102. In addition, the column driver 108 may selectively activate the column select lines in response to a column address decoder 106. Therefore, a row/column address may be provided to each pixel of the pixel array 110.

The control module 112 may control the row address decoder 102 and the column address decoder 106 which may select appropriate row and column select lines for pixel readout.

Specifically, the control module 112 may control the row driver 104 and the column driver 108 which may apply driving voltages to respective drive transistors of selected row and column select lines.

The digital CDS module 124 may perform a digital CDS process using a pixel reset signal and a pixel image signal for selected pixels of each column of the pixel array 110.

The digital CDS module 124 may include a sample and hold (S/H) module 114, an amplifier (AMP) module 116, a successive approximation analog-to-digital conversion (SA-ADC) module 118, and an arithmetic memory module 120.

The S/H module 114 may be associated with the column driver 108 and may include n number of S/H devices. Each of the S/H devices may sample and hold the pixel reset signal and the pixel image signal for selected pixels of the pixel array 110. Here, n may include an integer and may represent the number of columns or part of the number of columns.

The AMP module 116 may include n amplifiers and amplify the sampled and held pixel reset signal and pixel image signal.

The SA-ADC module 118 may include n number of SA-ADCs, and each of the SA-ADCs may convert the amplified pixel reset signal and the amplified pixel image signal into a digital pixel reset signal and a digital pixel image signal.

The arithmetic memory module 120 may include n number of arithmetic memories, and each of the arithmetic memories may generate a digital difference signal by effectively calculating a difference between the digital pixel reset signal and the digital pixel image signal using most-significant-bit-first calculation. Here, the most-significant-bit-first calculation may include an addition or subtraction operation including a binary operation.

The arithmetic memories will be described in detail later.

The image processor 122 may process the digital difference signal received from the arithmetic memory module 120 and may provide an output image color reproduction of an image captured by the pixels of the pixel array 110.

Specifically, the image processor 122 may perform various operations, and examples of the various operations may include, but not limited to, positional gain adjustment, defect correction, noise reduction, optical crosstalk reduction, demosaicing, resizing, and sharpening.

The arithmetic memories of FIG. 1 will now be described with reference to FIG. 2.

Figure 2:
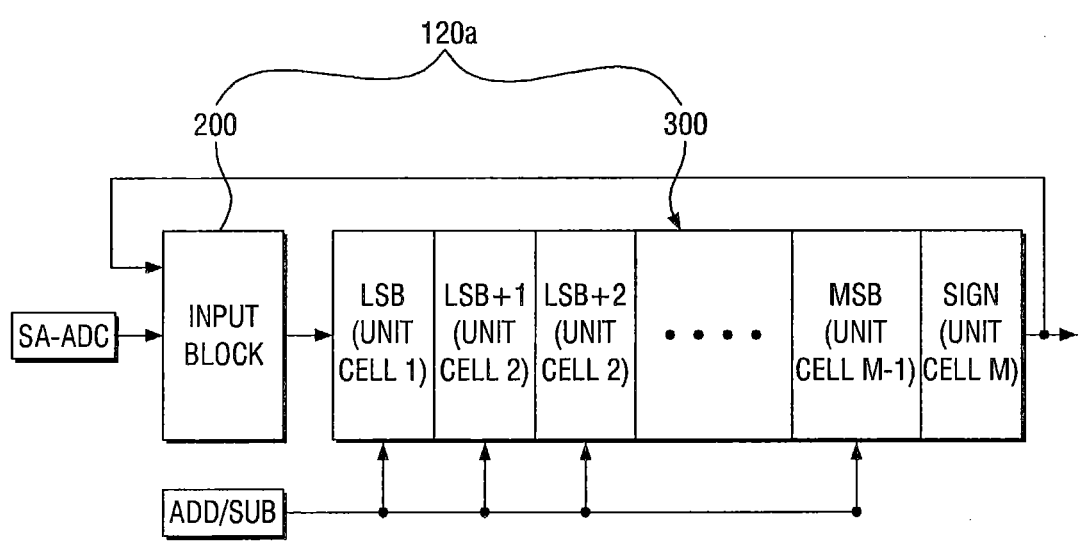
FIG. 2 is a block diagram of an arithmetic memory according to some embodiments of the present inventive concept.

FIG. 2 is a block diagram of an arithmetic memory according to some embodiments of the present inventive concept.

Referring to FIG. 2, an arithmetic memory 120a in FIG. 1 may include an input block 200 and a plurality of unit cells 300. For ease of description, one (the arithmetic memory 120a) of the arithmetic memories included in the arithmetic memory module 120 of FIG. 1 will be described as an example. That is, the other arithmetic memories may have substantially the same as or similar structure and features as the arithmetic memory 120a.

Specifically, the input block 200 may receive a digital pixel reset signal and a digital pixel image signal from an SA-ADC. In addition, an output of the input block 200 may be input to the unit cells 300, and an output of the unit cells 300 may be fed back to the input block 200.

The unit cells 300 may store bits of a digital difference signal representing a difference between the digital pixel reset signal and the digital pixel image signal.

Specifically, the unit cells 300 may include a first unit cell UNIT CELL 1 connected to the input block 200 and a second unit cell UNIT CELL 2 through an $M^{th}$ unit cell UNIT CELL M successively connected to the first unit cell UNIT CELL 1, where M may be a natural number that may be two or greater. The first unit cell UNIT CELL 1 may store a least significant bit (LSB), the $(M-1)^{th}$ unit cell UNIT CELL M-1 may store a most significant bit (MSB), and the $M^{th}$ unit cell UNIT CELL M may store a sign bit SIGN. That is, the LSB may be stored in a unit cell connected to the input block 200, and sequentially higher bits may respectively be stored in successive unit cells following the unit cell. Then, the MSB may be stored in the $(M-1)^{th}$ unit cell UNIT CELL M-1, and the sign bit SIGN may be stored in the last unit cell UNIT CELL M. In response to an operation signal ADD/SUB, the unit cells 300 may perform an addition or subtraction operation on the digital pixel reset signal and the digital pixel image signal received through the input block 200.

The arithmetic memory 120a of FIG. 2 according to some embodiments of the present inventive concept will now be described with reference to FIGS. 3 through 5, 6A thorough 6F and 7A through 7C.

Figure 3:
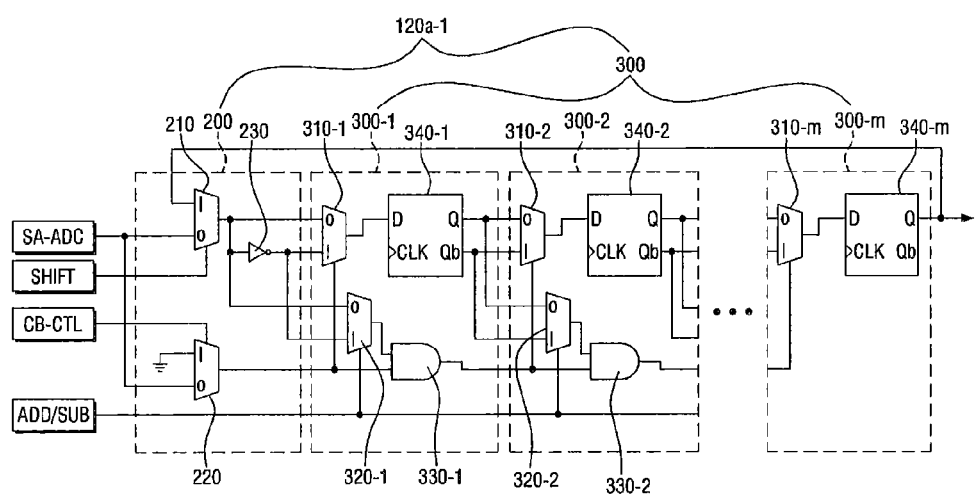
FIG. 3 is a diagram illustrating an arithmetic memory according to some embodiments of the present inventive concept.
Figure 4:
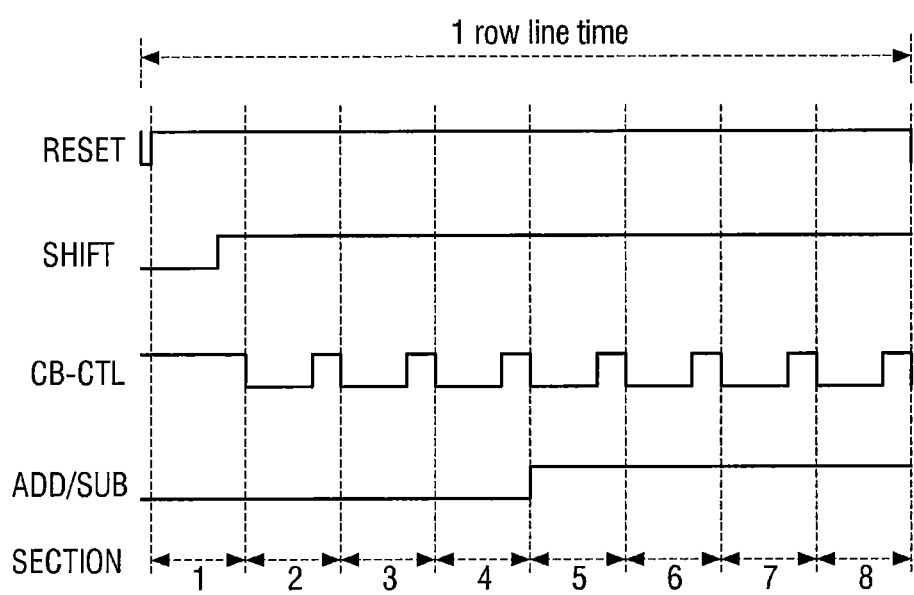
FIG. 4 is a timing diagram of the arithmetic memory illustrated in FIG. 3.
Figure 5:
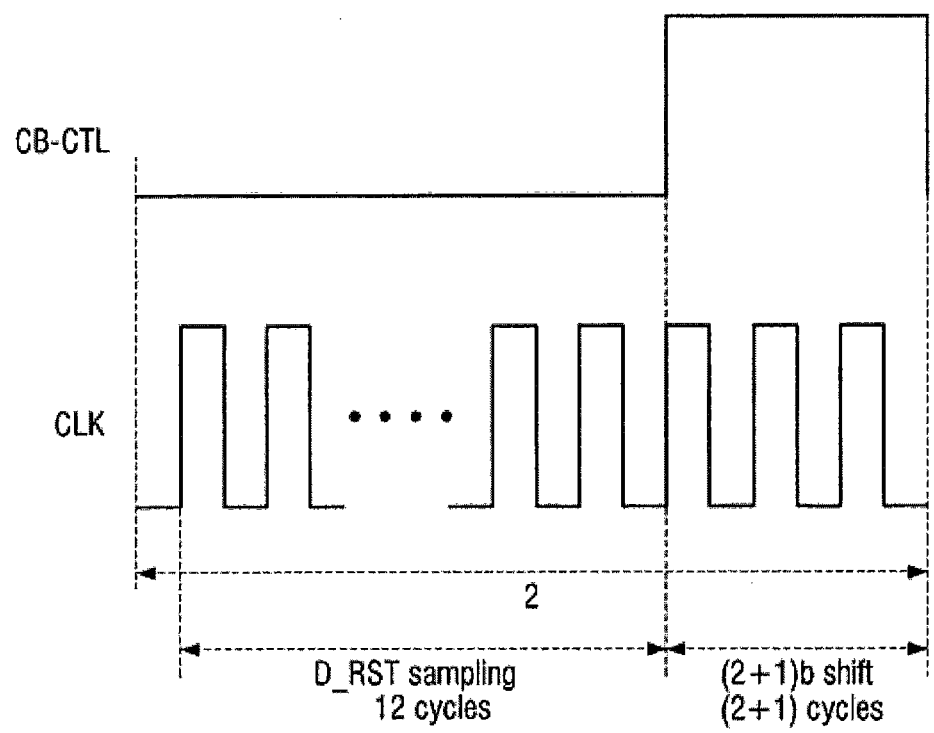
FIG. 5 is a diagram illustrating sampling according to a clock in a second section of FIG. 4.
Figure 6A:
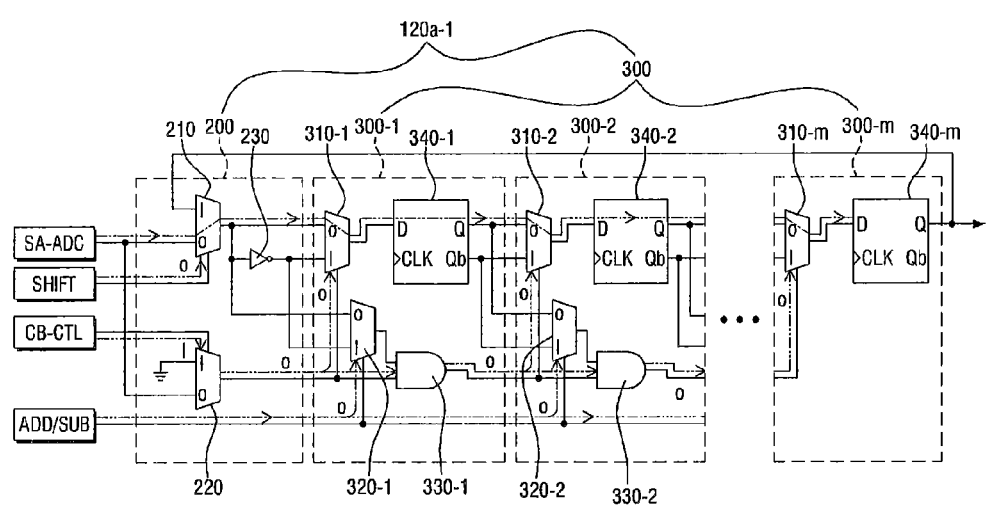
FIGS. 6A and 6B are diagrams illustrating a method of operating the arithmetic memory of FIG. 3 in a first section of FIG. 4.
Figure 6B:
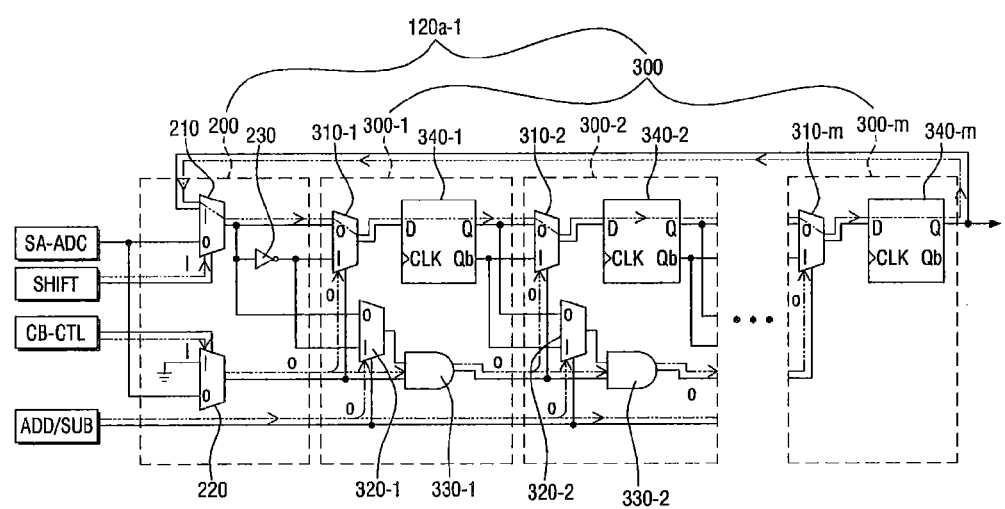

FIG. 3 is a diagram illustrating an arithmetic memory according to some embodiments of the present inventive concept. FIG. 4 is a timing diagram of the arithmetic memory illustrated in FIG. 3. FIG. 5 is a diagram illustrating sampling according to a clock in a second section of FIG. 4. FIGS. 6A and 6B are diagrams illustrating a method of operating the arithmetic memory 120a-1 in a first section of FIG. 4. FIGS. 6C through 6F are diagrams illustrating a method of operating the arithmetic memory of FIG. 3 in the second section of FIG. 4. FIGS. 7A through 7C are diagrams illustrating a method of operating the arithmetic memory of FIG. 3 in a fifth section of FIG. 4.

Referring to FIG. 3, the arithmetic memory 120a-1 may include an input block 200 and a plurality of unit cells 300.

The input block 200 may receive a pixel reset signal and a pixel image signal from an SA-ADC.

Specifically, the input block 200 may include a first multiplexer 210 and a second multiplexer 220 which receive a pixel reset signal and a pixel image signal from an SA-ADC and an inverter 230 which is connected to the first multiplexer 210.

The first multiplexer 210 may receive the pixel reset signal and the pixel image signal from the SA-ADC, receive a feedback signal from an $M^{th}$ unit cell 300-m among the unit cells 300, and receive a shift signal SHIFT from an external source. The external source may be, but is not limited to, a user or a kind of memory.

An output of the first multiplexer 210 may be provided to a third multiplexer 310-1 and a fourth multiplexer 320-1 of a first unit cell 300-1. In addition, the output of the first multiplexer 210 may be inverted by the inverter 230, and the inverted output of the first multiplexer 210 may be provided to the third multiplexer 310-1 and the fourth multiplexer 320-1.

The second multiplexer 220 may receive the pixel reset signal and the pixel image signal from the SA-ADC and may receive a carry/borrow control signal CB-CTL from an external source. The external source may be, but is not limited to, a user or a kind of memory.

An output of the second multiplexer 220 may be provided to the third multiplexer 310-1 and a first AND gate 330-1 of the first unit cell 300-1.

The inverter 230 may invert the output of the first multiplexer 210 and may provide the inverted output to the third multiplexer 310-1 and the fourth multiplexer 320-1.

The specific operation of the input block 200 will be described later.

The unit cells 300 may include the first unit cell 300-1 connected to the input block 200 and a second unit cell 300-2 through an $M^{th}$ unit cell 300-m successively connected to the first unit cell 300-1.

The first unit cell 300-1 may include the third multiplexer 310-1 and the fourth multiplexer 320-1 which are connected to the first multiplexer 210, a first flip-flop 340-1 which is connected to the third multiplexer 310-1, and the first AND gate 330-1 which is connected to the fourth multiplexer 320-1.

The third multiplexer 310-1 may receive the output of the first multiplexer 210, the output of the first multiplexer 210 inverted by the inverter 230, and the output of the second multiplexer 220. In addition, an output of the third multiplexer 310-1 may be provided to the first flip-flop 340-1.

The fourth multiplexer 320-1 may receive the output of the first multiplexer 210, the output of the first multiplexer 210 inverted by the inverter 230, and the operation signal ADD/SUB. In addition, an output of the fourth multiplexer 320-1 may be provided to the first AND gate 330-1.

The first flip-flop 340-1 may receive the output of the third multiplexer 310-1 and may store a bit of the pixel reset signal or the pixel image signal provided to the first unit cell 300-1. In addition, an output of the first flip-flop 340-1 may be provided to a fifth multiplexer 310-2 and a sixth multiplexer 320-2 of the second unit cell 300-2.

The first AND gate 330-1 may receive the output of the second multiplexer 220 and the output of the fourth multiplexer 320-1. In addition, an output of the first AND gate 330-1 may be provided to the fifth multiplexer 310-2 and a second AND gate 330-2 of the second unit cell 300-2.

The second unit cell 300-2 may include the fifth multiplexer 310-2 and the sixth multiplexer 320-2 which are connected to the first flip/flop 340-1, a second flip-flop 340-2 which is connected to the fifth multiplexer 310-2, and the second AND gate 330-2 which is connected to the sixth multiplexer 320-2.

The fifth multiplexer 310-2 may receive the output of the first flip-flop 340-1 and the output of the first AND gate 330-1. In addition, an output of the fifth multiplexer 310-2 may be provided to the second flip-flop 340-2.

The sixth multiplexer 320-2 may receive the output of the first flip-flop 340-1 and the operation signal ADD/SUB. In addition, an output of the sixth multiplexer 320-2 may be provided to the second AND gate 330-2.

The second flip-flop 340-2 may receive the output of the fifth multiplexer 310-2 and may store a bit of the pixel reset signal or the pixel image signal provided to the second unit cell 300-2. In addition, an output of the second flip-flop 340-2 may be provided to multiplexers of the third unit cell 300-3.

The second AND gate 330-2 may receive the output of the sixth multiplexer 320-2 and the output of the first AND gate 330-1. In addition, an output of the second AND gate 330-2 may be provided to a multiplexer and an AND gate of the third unit cell 300-3.

The second unit cell 300-2 may have substantially the same structure and connection relationship as the third unit cell 303-3 through an $(M-1)^{th}$ unit cell 300-$m$-1.

The $M^{th}$ unit cell 300-$m$ may include a seventh multiplexer 310-$m$ which is connected to a flip-flop of the $(M-1)^{th}$ unit cell 300-$m$-1 and a third flip-flop 340-$m$ which is connected to the seventh multiplexer 310-$m$.

The seventh multiplexer 310-$m$ may receive an output of the flip-flop of the $(M-1)^{th}$ unit cell 300-$m$-1 and an output of an AND gate of the $(M-1)^{th}$ unit cell 300-$m$-1. In addition, an output of the seventh multiplexer 310-$m$ may be provided to the third flip-flop 340-$m$.

The third flip-flop 340-$m$ may receive the output of the seventh multiplexer 310-$m$. In addition, an output of the third flip-flop 340-$m$ may be fed back to the first multiplexer 210 of the input block 200.

In FIG. 4, a timing diagram of the arithmetic memory 120$a$-1 of FIG. 3 is illustrated. To describe the timing diagram, it is assumed that each of the pixel reset signal and the pixel image signal input to the input block 200 may have 12 bits, the number of bits to be added by oversampling is 2 bits, and the number of times each of the pixel reset signal and the pixel image signal is oversampled is four times. In addition, it is assumed that the pixel reset signal is sampled four times sequentially and then the pixel image signal is sampled four times sequentially. The above assumptions are made only for ease of description, and the present inventive concept is not limited to these assumptions.

When a reset signal RESET is in a low state, the first and second unit cells 300-1 and 300-2 may be set to zero, and the third unit cell 300-3 may be set to one. In this case, the other unit cells may be set to zero or one. That is, the third unit cell 300-3 may be set to one in order for the sign bit, and the first and second unit cells 300-1 and 300-2 may be set to zero in order for 2 bits added by oversampling.

In a first section 1, when a shift signal SHIFT is in a low state, a first sampling value of the pixel reset signal may be input to the unit cells 300 from the MSB without an addition or subtraction operation. Then, when the shift signal SHIFT becomes a high state, bits set in the thirteenth unit cell 300-13 through the fifteenth unit cell 300-15 among the unit cells 300 may be shifted to be set in the first unit cell 300-1 through the third unit cell 300-3. In addition, bits set in the other unit cells may be sequentially shifted and set. That is, the first and second unit cells 300-1 and 300-2 may be set to zero, and the third unit cell 300-3 may be set to one. In addition, bits of the pixel reset signal may be sequentially set in the fourth unit cell 300-4 through the fifteenth unit cell 300-15 in order of LSB to MSB.

In a second section 2 through a fourth section 4, since the operation signal ADD/SUB is in a low state, the pixel reset signal may be oversampled three times more, and an addition operation may be performed. In a fifth section 5 through a eighth section 8, since the operation signal ADD/SUB is in a high state, the pixel image signal may be oversampled four times, and a subtraction operation may be performed. During the addition/subtraction operation, the carry/borrow control signal CB-CTL for controlling carry and borrow may be provided. The timing diagram will be described in more detail later.

In FIG. 5, a timing diagram of sampling according to the carry/borrow control signal CB-CTL and a clock CLK in the second section is illustrated. In the third and fourth sections, the arithmetic memory 120$a$-1 may operate in substantially the same way as in the second section. In the fifth through eighth sections, the arithmetic memory 120$a$-1 may operate in substantially the same way as in the second section, except that the pixel image signal is provided instead of the pixel reset signal and that the operation signal ADD/SUB is in a high state instead of a low state.

Referring to FIG. 5, when the carry/borrow control signal CB-CTL is in a low state, the pixel reset signal may be sampled during 12 cycles in response to a clock. In addition, the pixel reset signal may be shifted during (2+1) cycles in response to a clock. Since the pixel reset signal input to the input block 200 may have 12 bits, it is sampled during 12 cycles. In addition, since the number of bits to be added is 2 bits and the sign bit is 1 bit, the pixel reset signal may be shifted by a total of 3 bits.

That is, 12 bits of the pixel reset signal may be sampled and respectively set in unit cells and are shifted by 3 bits. Therefore, in a next sampling period, an addition operation may be performed on the MSB of the already input pixel reset signal and each bit of a newly input pixel reset signal sequentially from the MSB.

In FIG. 6A, the operation flow of the arithmetic memory 120$a$-1 in the first section of FIG. 4 is illustrated.

Referring to FIG. 6A, when the shift signal SHIFT becomes a low state, zero may be applied to the first multiplexer 210. Then, the first multiplexer 210 may select as its output a signal received from the SA-ADC instead of a signal fed back from the fifteenth unit cell 300-15. In addition, when the carry/borrow control signal CB-CTL becomes a high state, one may be applied to the second multiplexer 220. Therefore, an output of the second multiplexer 220 may be zero. Consequently, an output of the first AND gate 330-1 may be zero regardless of the output of the first multiplexer 210. In addition, since zero is applied to the third multiplexer 310-1, the third multiplexer 310-1 may provide a signal received from the SA-ADC to the first flip-flop 340-1 as its output.

This process may be performed for each cell sequentially until the shift signal SHIFT becomes a high state. Therefore, the bits of the pixel reset signal may be set in the first unit cell 300-1 through the twelfth unit cell 300-12 in order of LSB to MSB.

Referring to FIG. 6B, when the shift signal SHIFT becomes a high state, one may be applied to the first multiplexer 210. Then, the first multiplexer 210 may select as its output a signal fed back from the fifteenth unit cell 300-15 instead of a signal received from the SA-ADC. Since the carry/borrow control signal CB-CTL maintains a high state, the output of the first AND gate 330-1 may be still zero. In addition, since zero is applied to the third multiplexer 310-1, the third multiplexer 310-1 may provide a signal fed back from the fifteenth unit cell 300-15 to the first flip-flop 340-1. Here, a period of time during which the shift signal SHIFT maintains a high state in the first section may be a period of time required for 0, 0 and 1 bits set in the thirteenth unit cell 300-13 through the fifteenth unit cell 300-15 to be shifted and input to the first unit cell 300-1 through the third unit cell 300-3, respectively.

Therefore, as a result of the operation of the arithmetic memory 120a-1 illustrated in FIG. 6B, 0, 0 and 1 bit may respectively be set in the first through third unit cells 300-1 through 300-3, and 12 bits of the pixel reset signal described above with reference to FIG. 6A may be set in the fourth through fifteenth unit cells 300-4 through 300-15.

Various operation flows of the arithmetic memory 120a-1 in the second section of FIG. 4 are illustrated in FIGS. 6C through 6F. In the third and fourth sections of FIG. 4, the arithmetic memory 120a-1 may operate in substantially the same way as in the second section. Thus, a description of the operation of the arithmetic memory 120a-1 in the third and fourth sections will be omitted.

Figure 6C:
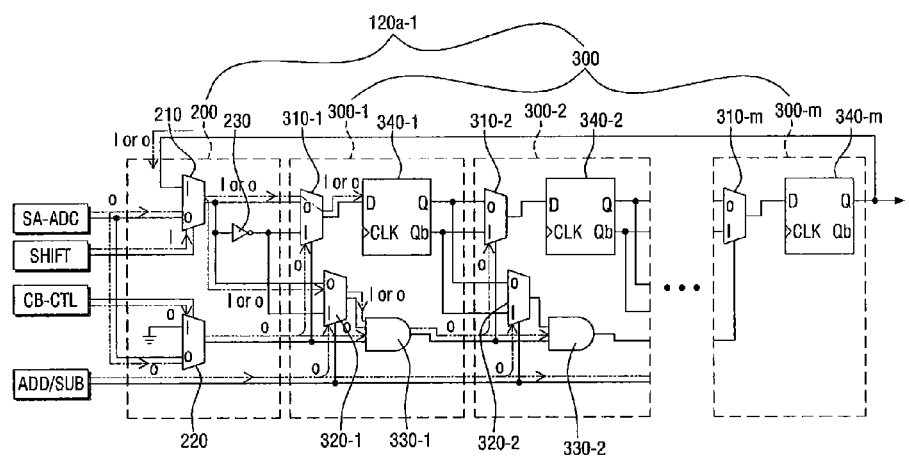
FIGS. 6C through 6F are diagrams illustrating a method of operating the arithmetic memory of FIG. 3 in the second section of FIG. 4.
Figure 7A:
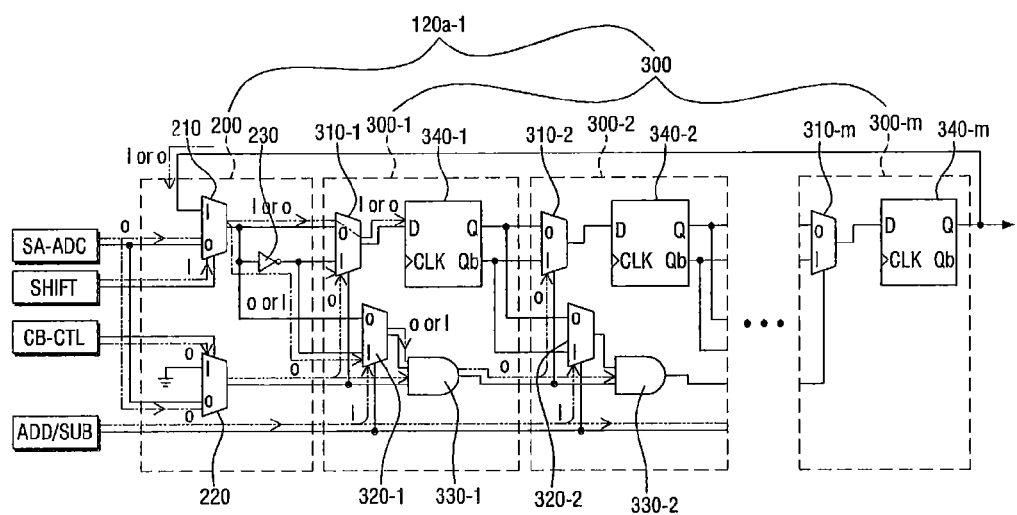
FIGS. 7A through 7C are diagrams illustrating a method of operating the arithmetic memory of FIG. 3 in a fifth section of FIG. 4.
Figure 7B:
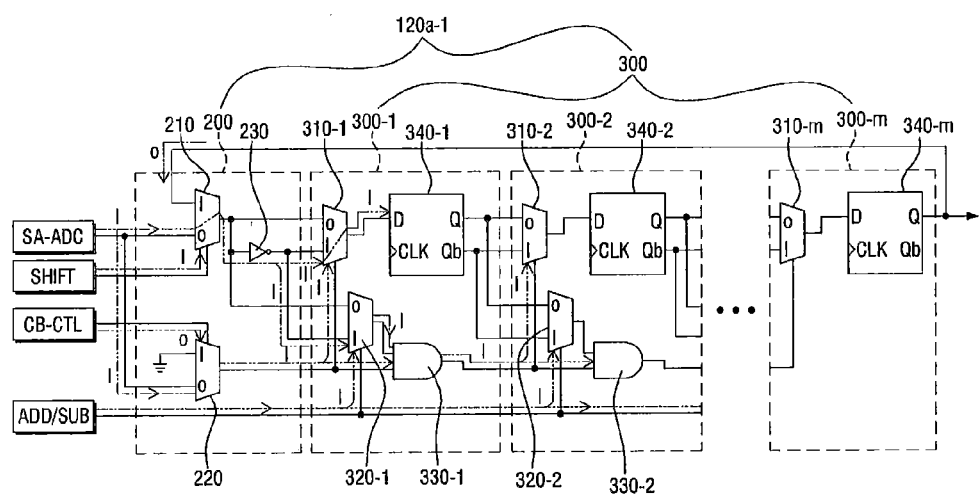
Figure 7C:
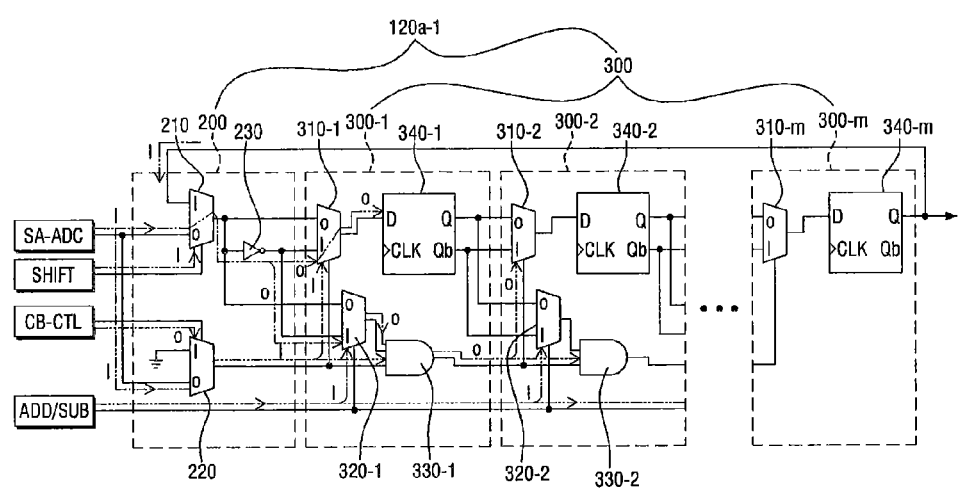

In FIG. 6C, a case where an output of the SA-ADC is zero and where a signal fed back from the fifteenth unit cell 300-15 is one or zero is illustrated. Here, it is assumed that the shift signal SHIFT is in a high state, the operation signal ADD/SUB is in a low state, and the carry/borrow control signal CB-CTL is in a low state. It is also assumed that a period of time during which the carry/borrow control signal CB-CTL maintains a low state is a period of time required for the pixel reset signal to be sampled during 12 cycles, that is, a period of time required for 12 bits of the pixel reset signal to be sequentially input to the first through twelfth unit cells 300-1 through 300-12.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the output of the second multiplexer 220 is zero, an output of the first AND gate 330-1 may be zero regardless of an output of the fourth multiplexer 320-1. In addition, since zero is applied to the third multiplexer 310-1, a signal (i.e., 1 or 0) fed back from the fifteenth unit cell 300-15 may be provided to the first flip-flop 340-1 as an output of the third multiplexer 310-1. In this case, outputs of not only the first AND gate 330-1 but also AND gates of the other unit cells may be zero. Therefore, a bit set in each unit cell can be shifted to a next unit cell without generating a carry.

Figure 6D:
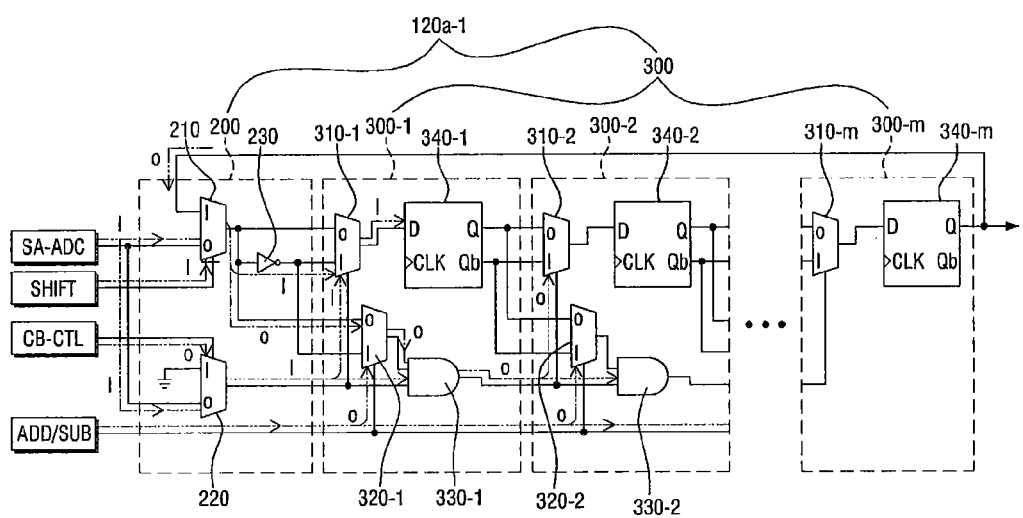

In FIG. 6D, a case where an output of the SA-ADC is one and where a signal fed back from the fifteenth unit cell 300-15 is zero is illustrated. Here, it is assumed that the shift signal SHIFT is in a high state, the operation signal ADD/SUB is in a low state, and the carry/borrow control signal CB-CTL is in a low state.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the output of the second multiplexer 220 is zero, zero may be applied to the fourth multiplexer 320-1, and the fourth multiplexer 320-1 may select zero, which is an uninverted output of the first multiplexer 210, as its output. Since the output of the second multiplexer 220 is one and the output of the fourth multiplexer 320-1 is zero, an output of the first AND gate 330-1 may be zero. In addition, since one is applied to the third multiplexer 310-1, an output (signal) of the first multiplexer 210 inverted by the inverter 230 may be selected as an output of the third multiplexer 310-1. Here, one may be selected as the output of the third multiplexer 310-1. Therefore, one may be provided to the first flip-flop 340-1 as the output of the third multiplexer 310-1, and no carry may be generated because the output of the first AND gate 330-1 is zero.

In this case, outputs of not only the first AND gate 330-1 but also AND gates of the other unit cells are zero. Therefore, a bit set in each unit cell can be shifted to a next unit cell without generating a carry.

Figure 6E:
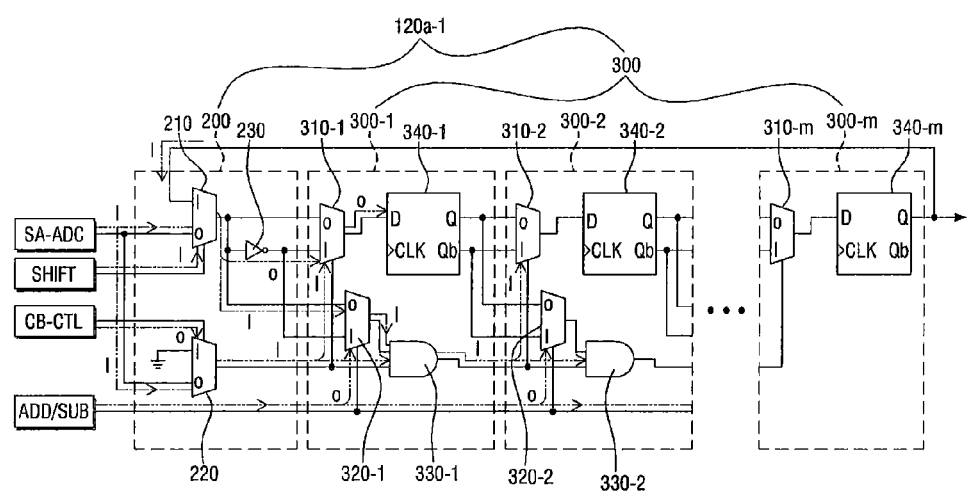

In FIG. 6E, a case where an output of the SA-ADC is one and where a signal fed back from the fifteenth unit cell 300-15 is one is illustrated. Here, it is assumed that the shift signal SHIFT is in a high state, the operation signal ADD/SUB is in a low state, and the carry/borrow control signal CB-CTL is in a low state.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the operation signal ADD/SUB is in a low state, zero may be applied to the fourth multiplexer 320-1, and the fourth multiplexer 320-1 may select one, which is an uninverted output of the first multiplexer 210, as its output. Since the output of the second multiplexer 220 is one and the output of the fourth multiplexer 320-1 is one, an output of the first AND gate 330-1 may be one. In addition, since one is applied to the third multiplexer 310-1, an inverted output (signal) of the first multiplexer 210 by the inverter 230 may be selected as an output of the third multiplexer 310-1. Here, zero may be selected as the output of the third multiplexer 310-1. Therefore, one may be provided to the first flip-flop 340-1 as the output of the third multiplexer 310-1, and a carry may be generated because the output of the first AND gate 330-1 is one.

In this case, since the output of the first AND gate 330-1 is one, an addition operation may be performed continuously until a unit cell in which no carry is generated is reached.

Figure 6F:
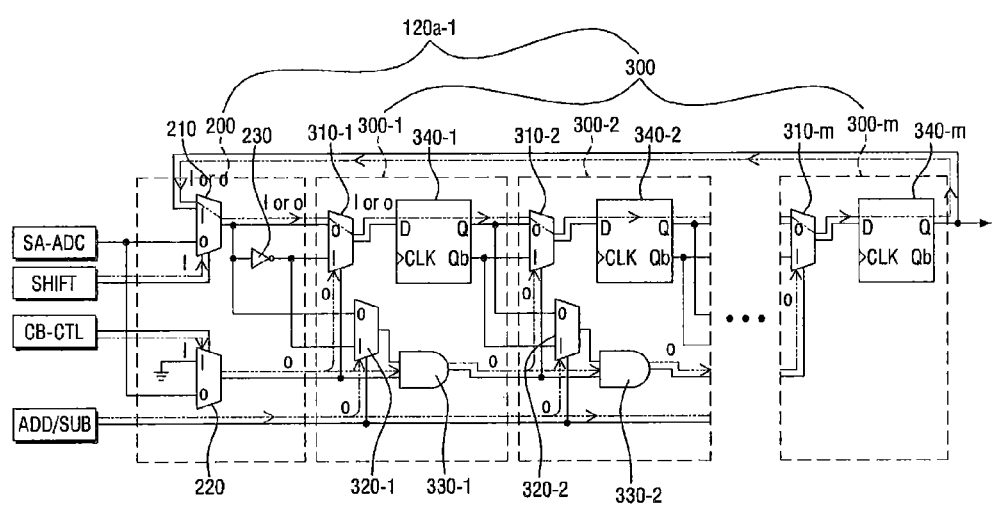

In FIG. 6F, a case where a signal fed back from the fifteenth unit cell 300-15 is one or zero is illustrated. In addition, it is assumed that the shift signal SHIFT is in a high state, that the operation signal ADD/SUB is in a low state, and that the carry/borrow control signal CB-CTL is in a high state.

Since the shift signal SHIFT is in a high state, a signal fed back from the fifteenth unit cell 300-15 may be selected as an output of the first multiplexer 210. However, since the carry/borrow control signal CB-CTL is in a high state, an output of the second multiplexer 220 may be zero regardless of an output of the SA-ADC, and an output of the first AND gate 330-1 may also be zero. In addition, since zero is applied to the third multiplexer 310-1, the third multiplexer 310-1 may provide an uninverted signal fed back from the fifteenth unit cell 300-15 to the first flip-flop 340-1. Here, a period of time during which the carry/borrow control signal CB-CTL maintains a high state in the second section is a period of time required for bits set in the thirteenth through fifteenth unit cells 300-13 through 300-15 to be shifted and input to the first through third unit cells 300-1 through 300-3, respectively.

In addition, since the output of the first AND gate 330-1 is zero, a bit set in each unit cell can be shifted to a next unit cell without generating a carry.

Various operation flows of the arithmetic memory 120a-1 in the fifth section of FIG. 4 are illustrated in FIGS. 7A through 7C. In the sixth through eighth sections of FIG. 4, the arithmetic memory 120a-1 may operate in substantially the same way as in the fifth section. Thus, a description of the operation of the arithmetic memory 120a-1 in the sixth through eighth sections will be omitted.

In FIG. 7A, a case where an output of the SA-ADC is zero and where a signal fed back from the fifteenth unit cell 300-15 is one or zero is illustrated. In addition, it is assumed that the shift signal SHIFT is in a high state, the operation signal ADD/SUB is in a high state, and the carry/borrow control signal CB-CTL is in a low state. It is also assumed that a period of time during which the carry/borrow control signal CB-CTL maintains a low state is a period of time required for the pixel image signal to be sampled during 12 cycles, that is, a period of time required for 12 bits of the pixel image signal to be sequentially input to the first through twelfth unit cells 300-1 through 300-12.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the output of the second multiplexer 220 is zero, an output of the first AND gate 330-1 may be zero regardless of an output of the fourth multiplexer 320-1. In addition, since zero is applied to the third multiplexer 310-1, a signal (i.e., 1 or 0) fed back from the fifteenth unit cell 300-15 may be provided to the first flip-flop 340-1 as an output of the third multiplexer 310-1. In this case, outputs of not only the first AND gate 330-1 but also AND gates of the other unit cells are zero. Therefore, a bit set in each unit cell can be shifted to a next unit cell without generating a carry.

In FIG. 7B, a case where an output of the SA-ADC is one and where a signal fed back from the fifteenth unit cell 300-15 is zero is illustrated. Here, it is assumed that the shift signal SHIFT is in a high state, the operation signal ADD/SUB is in a high state, and the carry/borrow control signal CB-CTL is in a low state.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the operation signal ADD/SUB is in a high state, one may be applied to the fourth multiplexer 320-1, and the fourth multiplexer 320-1 may select one, which is an inverted output of the first multiplexer 210, as its output. Since the output of the second multiplexer 220 is one and the output of the fourth multiplexer 320-1 is one, an output of the first AND gate 330-1 may be one. In addition, since one is applied to the third multiplexer 310-1, an output (signal) of the first multiplexer 210 inverted by the inverter 230 may be selected as an output of the third multiplexer 310-1. Here, one may be selected as the output of the third multiplexer 310-1. Therefore, one may be provided to the first flip-flop 340-1 as the output of the third multiplexer 310-1, and a carry may be generated because the output of the first AND gate 330-1 is one.

In this case, since the output of the first AND gate 330-1 is one, a subtraction operation may be performed successively until a unit cell in which no carry is generated is reached In FIG. 7C, a case where an output of the SA-ADC is one and where a signal fed back from the fifteenth unit cell 300-15 is one is illustrated. Here, it is assumed that the shift signal SHIFT is in a high state, that the operation signal ADD/SUB is in a high state, and that the carry/borrow control signal CB-CTL is in a low state.

Since the shift signal SHIFT is in a high state, a signal fed back from the fifteenth unit cell 300-15 may be selected as an output of the first multiplexer 210. In addition, since the carry/borrow control signal CB-CTL is in a low state, an output of the SA-ADC may be selected as an output of the second multiplexer 220. Since the operation signal ADD/SUB is in a high state, one may be applied to the fourth multiplexer 320-1, and the fourth multiplexer 320-1 may select zero, which is an inverted output of the first multiplexer 210, as its output. Since the output of the second multiplexer 220 is one and the output of the fourth multiplexer 320-1 is zero, an output of the first AND gate 330-1 may be zero. In addition, since one is applied to the third multiplexer 310-1, an output (signal) of the first multiplexer 210 inverted by the inverter 230 may be selected as an output of the third multiplexer 310-1. Here, zero may be selected as the output of the third multiplexer 310-1. Therefore, zero may be provided to the first flip-flop 340-1 as the output of the third multiplexer 310-1, and no carry may be generated because the output of the first AND gate 330-1 is zero.

In the fifth through eighth sections, as described above with reference to FIG. 6F, when the carry/borrow control signal CB-CTL becomes a high state, bits set in the thirteenth through fifteenth unit cells 300-13 through 300-15 may be shifted and input to the first through third unit cells 300-1 through 300-3, respectively.

In addition, when the carry/borrow control signal CB-CTL is in a high state, the output of the first AND gate 330-1 is zero. Therefore, a bit set in each unit cell can be shifted to a next unit cell without generating a carry.

When reset for the first time, the arithmetic memory 120a-1 of FIG. 3 may only have to set bits in three (one unit cell for the sign bit and two unit cells for oversampling) of the unit cells 300 by transmitting the shift signal SHIFT. In addition, the arithmetic memory 120a-1 may perform an addition/subtraction operation while the pixel reset signal and the pixel image signal are being oversampled. Therefore, no additional data storage space for the sampled pixel reset signal and the sampled pixel image signal is required. Furthermore, even when the pixel reset signal becomes smaller than the pixel image signal to have a difference of a negative number between them, a negative value can be obtained by adding a sign bit, that is, without using a blocking signal for preventing a previous value from being changed. The addition of the sign bit enables a carry/borrow to be selected simply without an additional signal (that is, an AND gate may have two input terminals) for a carry/borrow path.

Some embodiments of the arithmetic memory 120a of FIG. 2 will now be described with reference to FIGS. 8 and 9.

Figure 8:
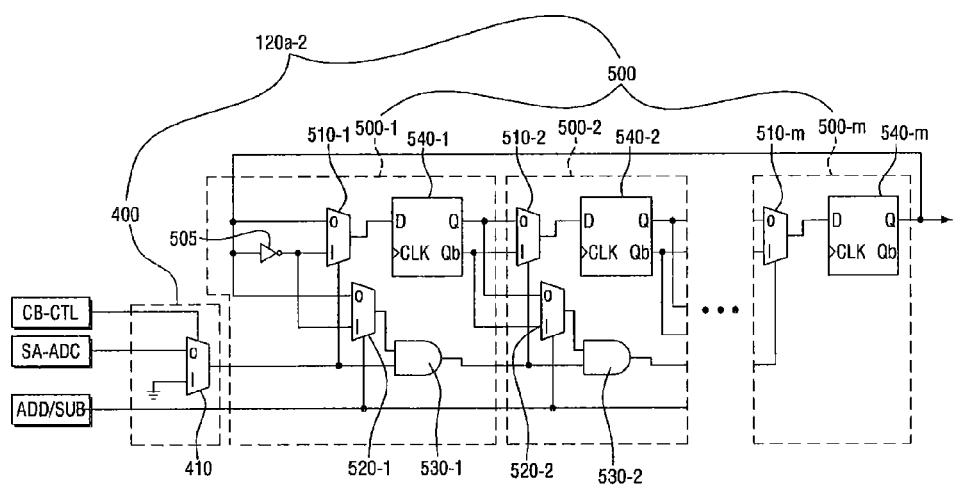
FIG. 8 is a diagram illustrating an arithmetic memory according to some embodiments of the present inventive concept.

FIG. 8 is a diagram illustrating an arithmetic memory according to some embodiments of the present inventive concept. FIG. 9 is a timing diagram of the arithmetic memory illustrated in FIG. 8.

Referring to FIG. 8, sn arithmetic memory 120a-2 may include an input block 400 and a plurality of unit cells 500.

The input block 400 may receive a pixel reset signal and a pixel image signal from an SA-ADC.

Specifically, the input block 400 may include a first multiplexer 410 which receives a pixel reset signal and a pixel image signal from an SA-ADC.

The first multiplexer 410 may receive the pixel reset signal and the pixel image signal from the SA-ADC and may receive a carry/borrow control signal CB-CTL from an external source. The external source may be, but is not limited to, a user or a kind of memory.

An output of the first multiplexer 410 may be provided to a second multiplexer 510-1 and a first AND gate 530-1 of a first unit cell 500-1.

That is, unlike the input block 200 of FIG. 3, the input block 400 of FIG. 8 may include only one multiplexer and may not include an inverter. In addition, the input unit 400 may not receive a shift signal SHIFT that may cause a pixel reset signal first input to the input block 400 to be input to the unit cells 500 from the MSB without an addition/subtraction operation. This will be described in detail later.

The unit cells 500 may include a first unit cell 500-1 connected to the input block 400 and a second unit cell 500-2 through an $M^{th}$ unit cell 500-m successively connected to the first unit cell 500-1.

The first unit cell 500-1 may receive a feedback signal from the Mth unit cell 500-m and include the second multiplexer 510-1 and a third multiplexer 520-1 which are connected to an inverter 505, a first flip-flop 540-1 which is connected to the second multiplexer 510-1, and the first AND gate 530-1 which is connected to the third multiplexer 520-1.

The second multiplexer 510-1 may receive the output of the first multiplexer 410, the feedback signal of the Mth unit cell 500-m inverted by the inverter 505, and the uninverted feedback signal of the $M^{th}$ unit cell 500-m. In addition, an output of the second multiplexer 510-1 may be provided to the first flip-flop 540-1.

The third multiplexer 520-1 may receive the feedback signal of the $M^{th}$ unit cell 500-m inverted by the inverter 505, the uninverted feedback signal of the $M^{th}$ unit cell 500-m, and an operation signal ADD/SUB. In addition, an output of the third multiplexer 520-1 may be provided to the first AND gate 530-1.

The first flip-flop 540-1 may receive the output of the second multiplexer 510-1 and may store a bit of the pixel reset signal or the pixel image signal provided to the first unit cell 500-1. In addition, an output of the first flip-flop 540-1 may be provided to a fourth multiplexer 510-2 and a fifth multiplexer 520-2 of the second unit cell 500-2.

The first AND gate 530-1 may receive the output of the first multiplexer 410 and the output of the third multiplexer 520-1. In addition, an output of the first AND gate 530-1 may be provided to the fourth multiplexer 510-2 and a second AND gate 530-2 of the second unit cell 500-2.

That is, unlike in the first unit cell 300-1 of FIG. 3, in the first unit cell 500-1 of FIG. 8, the feedback signal of the Mth unit cell 500-m may be input directly to the second multiplexer 510-1 and the third multiplexer 520-1 without via the input block 400. In addition, the inverter 505 may be not in the input block 400 but in the first unit cell 500-1.

The second unit cell 500-2 may include the fourth multiplexer 510-2 and the fifth multiplexer 520-2 which are connected to the first flip/flop 540-1, a second flip-flop 540-2 which is connected to the fourth multiplexer 510-2, and the second AND gate 530-2 which is connected to the fifth multiplexer 520-2.

The fourth multiplexer 510-2 may receive the output of the first flip-flop 540-1 and the output of the first AND gate 530-1. In addition, an output of the fourth multiplexer 510-2 may be provided to the second flip-flop 540-2.

The fifth multiplexer 520-2 may receive the output of the first flip-flop 540-1 and the operation signal ADD/SUB. In addition, an output of the fifth multiplexer 520-2 may be provided to the second AND gate 530-2.

The second flip-flop 540-2 may receive the output of the fourth multiplexer 510-2 and may store a bit of the pixel reset signal or the pixel image signal provided to the second unit cell 500-2. In addition, an output of the second flip-flop 540-2 may be provided to multiplexers of the third unit cell 500-3.

The second AND gate 530-2 may receive the output of the fifth multiplexer 520-2 and the output of the first AND gate 530-1. In addition, an output of the second AND gate 530-2 may be provided to a multiplexer and an AND gate of the third unit cell 500-3.

The second unit cell 500-2 may have substantially the same structure and connection relationship as the third through $(M-1)^{th}$ unit cells 500-3 through 500-m-1. Thus, a description of the third through $(M-1)^{th}$ unit cells 500-3 through 500-m-1 will be omitted.

The $M^{th}$ unit cell 500-m may include a sixth multiplexer 510-m which is connected to a flip-flop of the $(M-1)^{th}$ unit cell 500-m-1 and a third flip-flop 540-m which is connected to the sixth multiplexer 510-m.

The sixth multiplexer 510-m may receive an output of the flip-flop of the $(M-1)^{th}$ unit cell 500-m-1 and an output of an AND gate of the $(M-1)^{th}$ unit cell 500-m-1. In addition, an output of the sixth multiplexer 510-m may be provided to the third flip-flop 540-m.

The third flip-flop 540-m may receive the output of the sixth multiplexer 510-m. In addition, an output of the third flip-flop 540-m may be fed back to the second multiplexer 510-1 and the third multiplexer 520-1 of the first unit cell 500-1.

That is, unlike in the Mth unit cell 300-m of FIG. 3, in the Mth unit cell 500-m of FIG. 8, the feedback signal of the Mth unit cell 500-m may be input directly to the second multiplexer 510-1 and the third multiplexer 520-1 without via the input block 400.

Figure 9:
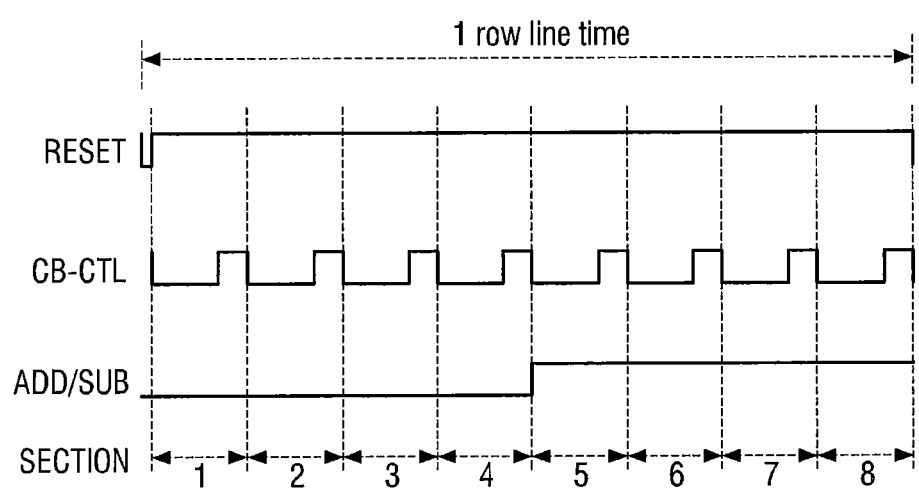
FIG. 9 is a timing diagram of the arithmetic memory illustrated in FIG. 8.

In FIG. 9, a timing diagram of the arithmetic memory 120a-2 of FIG. 8 is illustrated. A redundant description of features and aspects of the timing diagram identical to those of the timing diagram of FIG. 4 will be omitted. The same assumption applied to the timing diagram of FIG. 4 will be applied to the timing diagram of FIG. 9.

Referring to FIG. 9, when a reset signal RESET is in a low state, the third unit cell 500-3 may be set to one, and the other unit cells may be set to zero.

That is, unlike the arithmetic memory 120a-1 of FIG. 3, the arithmetic memory 120a-2 of FIG. 8 may not receive the shift signal SHIFT that causes a first sampling value of the pixel reset signal to be input directly to the unit cells 500 from the MSB. Instead, the arithmetic memory 120*a*-2 may immediately start an addition operation on the pixel reset signal.

That is, when the reset signal RESET becomes a high state, the carry/borrow control signal CB-CTL becomes a low state in a first section, and the addition operation performed in the second section of FIG. 4 may be performed immediately.

In other words, in a first section 1 through a fourth section 4 of FIG. 9, the arithmetic memory 120*a*-2 may perform substantially the same operation as in the second through fourth sections of FIG. 4. In a fifth section through a eighth section of FIG. 9, the arithmetic memory 120*a*-2 may perform substantially the same operation as in the fifth through eighth sections of FIG. 4.

The arithmetic memory 120*a*-2 of FIG. 8 can reduce the design area of circuit and power consumption by simplifying elements of the input block 400 and removing the shift signal SHIFT. In addition, the arithmetic memory 120*a*-2 may perform an addition/subtraction operation while the pixel reset signal and the pixel image signal are being oversampled. Therefore, no additional data storage space for the sampled pixel reset signal and the sampled pixel image signal may be required. Furthermore, even when the pixel reset signal becomes smaller than the pixel image signal to have a difference of a negative number between them, a negative value can be obtained by adding a sign bit, that is, without using a blocking signal for preventing a previous value from being changed. The addition of the sign bit enables a carry/borrow to be selected simply without an additional signal (that is, an AND gate may have two input terminals) for a carry/borrow path.

Figure 10:
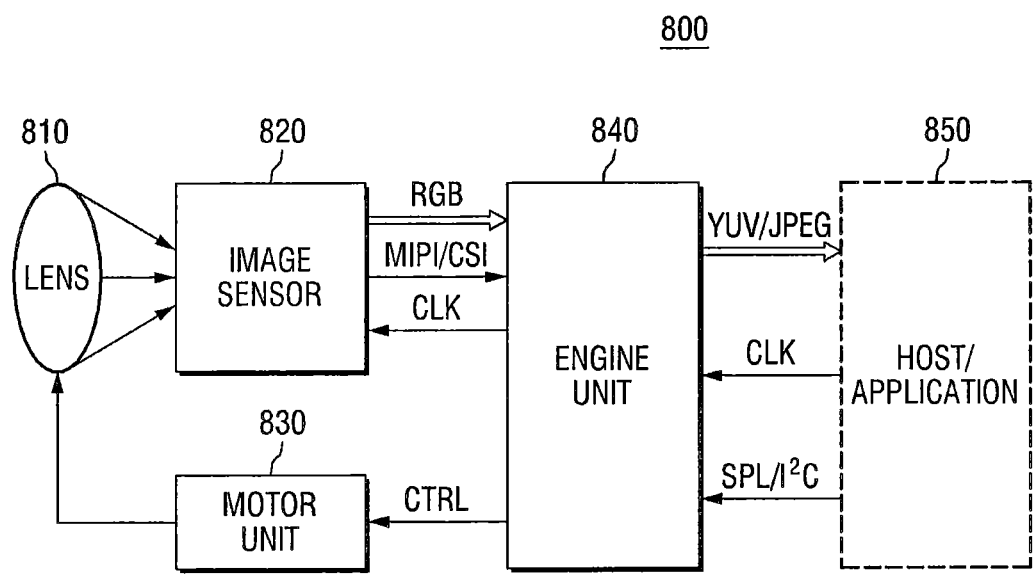
FIG. 10 is a block diagram of a digital camera using an image sensor according to some embodiments of the present inventive concept.

FIG. 10 is a block diagram of a digital camera using an image sensor according to some embodiments of the present inventive concept.

Referring to FIG. 10, a digital camera 800 may include a lens 810, an image sensor 820, a motor unit 830, and an engine unit 840. The image sensor 820 may be an image sensor that uses an offset-compensated reference voltage as a reference voltage for ADC.

The lens 810 may focus incident light onto a light-receiving region of the image sensor 820. The image sensor 820 may generate RGB data RGB in a Bayer pattern based on the light received through the lens 810. The image sensor 820 may provide the RGB data RGB based on a clock signal CLK.

In some embodiments, the image sensor 820 may interface with the engine unit 840 using a mobile industry processor interface (MIPI) and/or a camera serial interface (CSI).

The motor unit 830 may adjust the focus of the lens 810 or may perform shuttering in response to a control signal CTRL received from the engine unit 840. The engine unit 840 may control the image sensor 820 and the motor unit 830. In addition, the engine unit 840 may generate YUV data YUV including a luminance component, a difference between the luminance component and a blue component and a difference between the luminance component and a red component or generate compressed data, e.g., Joint Photography Experts Group (JPEG) data based on the RGB data RGB received from the image sensor 820.

The engine unit 840 may be connected to a host/application 850 and may provide the YUV data YUV or the JPEG data to the host/application 850 based on a master clock MCLK. In addition, the engine unit 840 may interface with the host/application 850 using a serial peripheral interface (SPI) and/or an inter-integrated circuit ($I^2C$).

Figure 11:
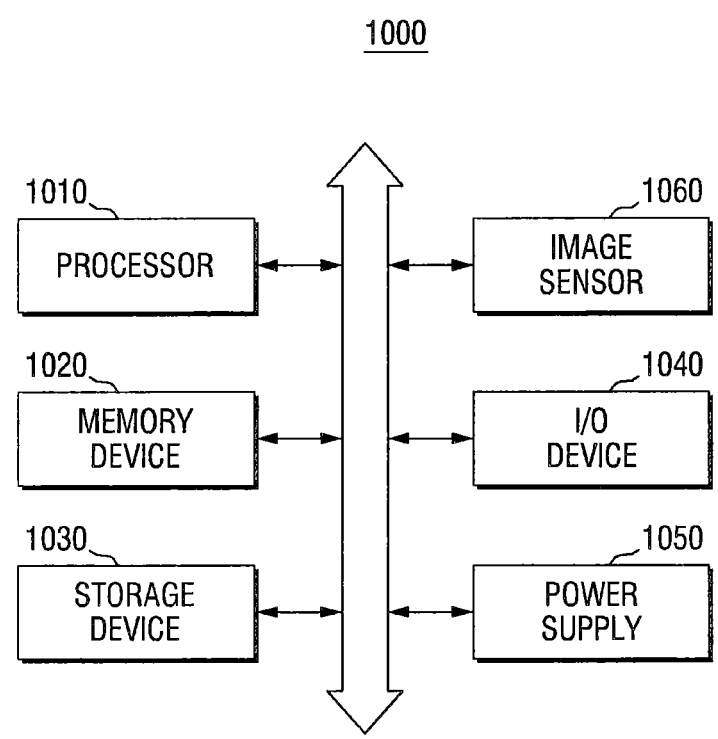
FIG. 11 is a block diagram of a computing system using an image sensor according to some embodiments of the present inventive concept.

FIG. 11 is a block diagram of a computing system using an image sensor according to some embodiments of the present inventive concept.

Referring to FIG. 11, a computing system 1000 may include a processor 1010, a memory device 1020, a storage device 1030, an input/output (I/O) device 1040, a power supply 1050, and an image sensor 1060.

The image sensor 1060 may be an image sensor that uses an offset-compensated reference voltage as a reference voltage for ADC. In some embodiments, the computing system 1000 may further include ports that can communicate with a video card, a sound card, a memory card, a USB device, or other electronic devices.

The processor 1010 may perform various calculations or tasks. In some embodiments, the processor 1010 may be a microprocessor or a central processing unit (CPU).

The processor 1010 may communicate with the memory device 1020, the storage device 1030 and the I/O device 1040 through an address bus, a control bus, and a data bus.

In some embodiments, the processor 1010 may be coupled to an extended bus, such as a peripheral component interconnection (PCI) bus. The memory device 1020 may store data required for the operation of the computing system 1000.

For example, the memory device 1020 may be a dynamic random access memory (DRAM), a mobile DRAM, a static random access memory (SRAM), a phase random access memory (PRAM), a ferroelectric random access memory (FRAM), a resistive random access memory (RRAM), and/or a magnetic random access memory (MRAM). The storage device 1030 may include a solid state drive (SSD), a hard disk drive (HDD), a CD-ROM, etc.

The I/O device 1040 may include an input device (e.g., a keyboard, a keypad, a mouse, etc.) and an output device (e.g., a printer, a display, etc.). The power supply 1050 may supply an operating voltage required for the operation of the computing system 1000.

The image sensor 1060 may be connected to and communicate with the processor 1010 via buses or other communication links. As described above, the image sensor 1060 may generate precise image data by compensating for an offset of a reference voltage. The image sensor 1060 and the processor 1010 may be integrated together onto a single chip or may be integrated separately onto different chips, respectively.

The computing system 1000 may be any type of computing system using an image sensor. For example, the computing system 1000 may be a digital camera, a mobile phone, a personal digital assistant (PDA), a portable multimedia player (PMP), a smart phone, a table PC, etc.

FIG. 12 is a block diagram of interfaces used in the computing system of FIG. 11.

Referring to FIG. 12, a computing system 1100 may be implemented as a data processing device that can use or support the MIPI. The computing system 1100 may include an application processor 1110, an image sensor 1140 and a display 1150.

A CSI host 1112 of the application processor 1110 may perform serial communication with a CSI device 1141 of the image sensor 1140 via a CSI.

According to some embodiments, the CSI host 1112 may include a deserializer (DES), and the CSI device 1141 may include a serializer (SER). A display serial interface (DSI) host 1111 of the application processor 1110 may perform serial communication with a host DSI device 1151 of the display 1150 via a DSI. In some embodiments of the present inventive concept, the DSI host 1111 may include an SER, and the host DSI device 1151 may include a DES. The computing system 1100 may further include a radio frequency (RF) chip 1160 which can communicate with the application processor 1110. A physical layer (PHY) 1113 of the computing system 1100 and a PHY 1161 of the RF chip 1160 may perform data communications based on a MIPI DigRF. The RF chip 1160 may include DigRF SLAVE 1162.

The application processor 1110 may further include a DigRF MASTER 1114 which controls the data communication of the PHY 1161 based on the MIPI DigRF. The computing system 1100 may further include a global positioning system (GPS) 1120, a storage 1170, a microphone 1180, a DRAM 1185, and a speaker 1190. In addition, the computing system 1100 may perform communications using, for example, an ultra wideband (UWB) 1210, a wireless local area network (WLAN) 1220, a worldwide interoperability for microwave access (WIMAX) 1230, etc. However, the above structure and interfaces of the computing system 1100 are merely an example, and the present inventive concept is not limited to this example.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. An arithmetic memory module comprising:
an input block to which a digital pixel reset signal and a digital pixel image signal are input; and
a plurality of unit cells configured to generate a digital difference signal representing a difference between the digital pixel reset signal and the digital pixel image signal, wherein:
the input block comprises first and second multiplexers to which the digital pixel reset signal and the digital pixel image signal are input and an inverter that is connected to the first multiplexer;
the plurality of unit cells comprise a first unit cell that is connected to the input block and a second unit cell through an N-th unit cell that are successively connected to the first unit cell;
N is a natural number that is two or greater; and
the first unit cell comprises third and fourth multiplexers that are connected to the first multiplexer and the inverter, a first flip/flop that is connected to the third multiplexer, and a first AND gate that is connected to the fourth multiplexer and the second multiplexer;
wherein the first multiplexer receives a shift signal and a feedback signal from the N-th unit cell;
the shift signal is configured to cause the digital pixel reset signal first input to the first multiplexer to be input to the plurality of unit cells from a most significant bit (MSB) without an addition or subtraction operation;
the second multiplexer receives a carry/borrow control signal, wherein a carry/borrow is not performed when the carry/borrow control signal is in a high state and is performed when the carry/borrow control signal is in a low state.

2. The arithmetic memory module of claim 1, wherein:
each of the digital pixel reset signal and the digital pixel image signal that is input to the input block is an M-bit signal and is converted into an (N−1)-bit signal through oversampling performed by the plurality of unit cells; and
M is a natural number, and (N−1) is a natural number greater than M.

3. The arithmetic memory module of claim 2, wherein:
the plurality of unit cells is configured to perform an addition operation while sampling the digital pixel reset signal input to the input block 2P times and is configured to perform a subtraction operation while sampling the digital pixel image signal input to the input block 2P times; and
P is a natural number that is equal to a difference between (N−1) and M.

4. The arithmetic memory module of claim 3, wherein:
P number of unit cells among the first unit cell through the N-th unit cell are unit cells for P number of bits to be added by oversampling; and
one of the first unit cell through the N-th unit cell is a unit cell for a sign bit.

5. The arithmetic memory module of claim 4, wherein:
the unit cells for the P number of bits to be added by oversampling are set to zero before the input of the digital pixel reset signal; and
the unit cell for the sign bit is set to one before the input of the digital pixel reset signal.

6. The arithmetic memory module of claim 1, wherein the first AND gate receives an output of the second multiplexer.

7. The arithmetic memory module of claim 1, wherein the second unit cell comprises fifth and sixth multiplexers that are connected to the first flip/flop of the first unit cell, a second flip/flop that is connected to the fifth multiplexer, and a second AND gate that is connected to the sixth multiplexer.

8. The arithmetic memory module of claim 7, wherein the third unit cell through the (N−1)-th unit cell have substantially equal structure to the second unit cell.

9. The arithmetic memory module of claim 8, wherein:
the N-th unit cell comprises a seventh multiplexer that is connected to a flip/flop of the (N−1)-th unit cell and a third flip/flop that is connected to the seventh multiplexer; and
an output of the third flip/flop is fed back to the first multiplexer.

10. The arithmetic memory module of claim 7, wherein the second AND gate receives an output of the first AND gate.

11. An arithmetic memory module comprising:
an input block to which M-bit digital pixel reset signal and an M-bit digital pixel image signal are input;
a plurality of unit cells configured to generate a digital difference signal representing a difference between the digital pixel reset signal and the digital pixel image signal, wherein:
the input block comprises a first multiplexer to which the digital pixel reset signal and the digital pixel image signal are input;
the plurality of unit cells comprise a first unit cell that is connected to the input block and a second unit cell through an N-th unit cell that are successively connected to the first unit cell;
N is a natural number that is two or greater; and
the first unit cell comprises second and third multiplexers that receive a feedback signal of the N-th unit cell and are connected to an inverter, a flip/flop that is connected to the second multiplexer, and an AND gate that is connected to the third multiplexer and the first multiplexer, wherein the first multiplexer receives a carry/borrow control signal and a carry/borrow is not generated when the carry/borrow control signal is in a high state and is generated when the carry/borrow control signal is in a low state.

12. The arithmetic memory module of claim 11, wherein:
a first one of the plurality of unit cells configured to store a sign bit is set to one before the input of the M-bit digital pixel reset signal; and
ones of the plurality of unit cells except the first one of the plurality of unit cells are set to zero before the input of the M-bit digital pixel reset signal.

13. An image sensor comprising:
a pixel array comprising a plurality of pixels configured to provide a pixel reset signal and a pixel image signal; and
a digital correlated double sampling (CDS) module that is connected to the pixel array, wherein the digital CDS module comprises:
   a successive approximation analog-to-digital conversion (SA ADC) module that is configured to convert the pixel reset signal and the pixel image signal in an analog form into an M-bit digital pixel reset signal and an M-bit digital pixel image signal; and
   an arithmetic memory module that is configured to generate a digital difference signal representing a difference between the M-bit digital pixel reset signal and the M-bit digital pixel image signal, wherein the arithmetic memory module comprises:
      an input block that receives the M-bit digital pixel reset signal and the M-bit digital pixel image signal and comprises a first multiplexer and an inverter that is connected to the first multiplexer; and
      a plurality of unit cells, each of the plurality of unit cells configured to store a bit of the digital difference signal and comprising a second multiplexer and an AND gate and a flip/flop that are connected to the second multiplexer, wherein the plurality of unit cells is configured to perform an addition operation while sampling the M-bit digital pixel reset signal input to the input block $2^P$ times and is configured to perform a subtraction operation while sampling the M-bit digital pixel image signal input to the input block $2^P$ times; and P is a natural number that is equal to a difference between (N−1) and M, where N is a natural number that is equal to at least two.

* * * * *